United States Patent [19]
Tamura et al.

[11] Patent Number: 5,455,634
[45] Date of Patent: Oct. 3, 1995

[54] DARK LEVEL RESTORING CIRCUIT FOR TELEVISION RECEIVER

[75] Inventors: Takahiko Tamura, Tokyo; Yumiko Mito, Kanagawa, both of Japan

[73] Assignee: Sony Corporation, Tokyo, Japan

[21] Appl. No.: 269,071

[22] Filed: Jun. 30, 1994

[30] Foreign Application Priority Data

Jul. 5, 1993 [JP] Japan .................................. 5-165584

[51] Int. Cl.$^6$ ...................................... H04N 3/24
[52] U.S. Cl. ......................... 348/634; 348/637; 348/633
[58] Field of Search .................................... 348/632–635, 348/637, 687, 690–692; H04N 3/24

[56] References Cited

U.S. PATENT DOCUMENTS

| | | |
|---|---|---|
| 4,028,226 | 7/1977 | Argy .......................................... 348/637 |
| 4,631,589 | 12/1986 | Hongu et al. . |
| 4,668,974 | 5/1987 | Kita et al. ............................ 348/637 X |
| 4,942,471 | 7/1990 | Chikuma et al. ........................ 348/634 |
| 5,134,479 | 7/1992 | Ohishi ................................. 348/634 X |

FOREIGN PATENT DOCUMENTS

0520339A2  12/1992  European Pat. Off. .

Primary Examiner—Victor R. Kostak
Attorney, Agent, or Firm—William S. Frommer; Alvin Sinderbrand

[57] ABSTRACT

A dark level restoring circuit for a television receiver which receives a video signal, clamps a pedestal portion of the video signal to a reference pedestal level by a pedestal clamper, compares the output of the pedestal clamper with a reference dark level, and amplifies the compared result by a gain control amplifier. The output of the pedestal clamper and the amplified compared result are synthesized, the dark peak level is held, and the held dark peak level and the reference pedestal level are compared wherein the gain of the gain control amplifier is controlled by the compared result. A blanking signal is received, and a mute signal is generated which corresponds to a non-video signal portion when the effective raster size of the video signal is smaller than the size of a face plate of a cathode ray tube to which the video signal is supplied. The blanking signal and the mute signal are synthesized and a control signal is generated which controls the gain control amplifier such that its gain is minimized and the holding of the dark peak level is inactive.

3 Claims, 5 Drawing Sheets

FIG. 2B (PRIOR ART) Video Signal

FIG. 2C (PRIOR ART) Blanking Signal

FIG. 2D (PRIOR ART) Output Signal

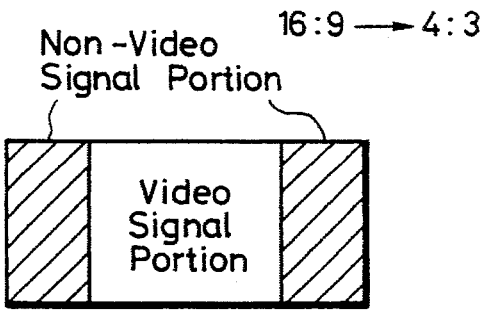
FIG. 4A
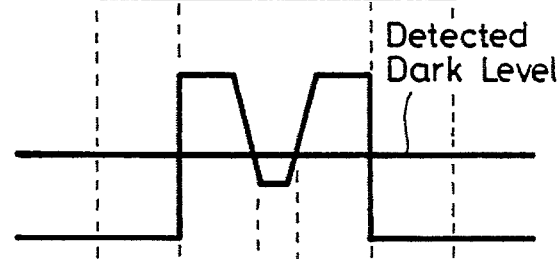
FIG. 4B Video Signal
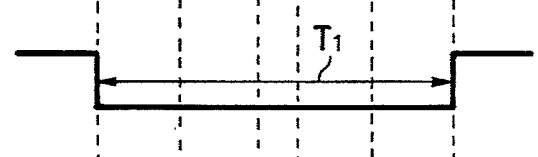
FIG. 4C Blanking Signal
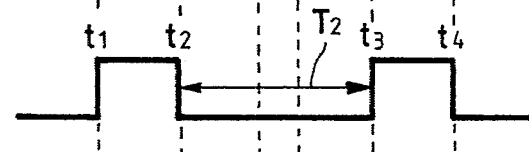
FIG. 4D Mute Signal
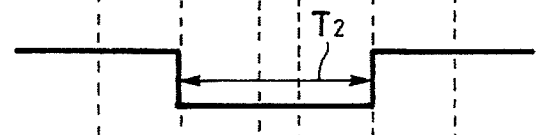
FIG. 4E Output Signal of or Gate
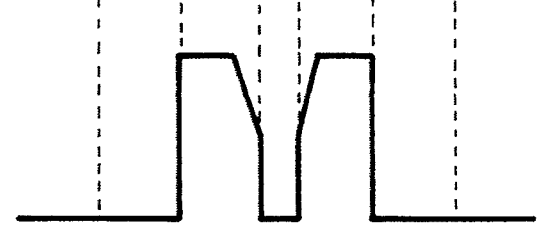
FIG. 4F Output Signal

DARK LEVEL RESTORING CIRCUIT FOR TELEVISION RECEIVER

BACKGROUND OF THE INVENTION

1. Field of the invention

The present invention relates to a dark level ring circuit for use with a television receiver.

2. Description of the Prior Art

An example of a conventional dark level restoring circuit (U.S. Pat. No. 4,631,589) will be described below with reference to FIG. 1 of the accompanying drawings.

As shown in FIG. 1, a video signal applied to an input terminal 1 from a video signal source (not shown) is supplied to a pedestal clamp circuit 2, in which pedestal level of the input video signal is clamped to reference pedestal level of a reference voltage source 3. A video signal from the pedestal clamp circuit 2 is supplied to a dark detector/dark expander (dark level detector/dark level expander) 5 and a synthesizer (adder) 4.

The dark detector/dark expander 5 comprises a level comparator 6 and a variable gain amplifier (gain controller) 8. The video signal from the pedestal clamp circuit 2 is supplied to the level comparator 6 which detects a dark level signal portion below the reference dark level by comparing the level of the video signal supplied thereto with a reference dark level from a reference voltage source 7. The dark level signal portion is supplied to a variable gain amplifier (gain controller) 8, in which the dark level signal portion is lowered and expanded. A gain of the variable gain amplifier 8 is controlled in response to a compared output level from a level comparator 14 which will be described later on.

The dark level signal portion that had been expanded by the variable gain amplifier 8 in the dark detector/dark expander 5 is added to or replaced with the dark level signal portion of the video signal clamped by the pedestal clamp circuit 2 so that a video signal whose dark level portion is expanded is output from an output terminal 13. This output video signal is processed by some suitable video signal processing means (not shown) and supplied to a cathode ray tube (CRT), not shown. Simultaneously, this output video signal is supplied to a dark peak hold circuit 12. The gain of the variable gain amplifier 8 is optimized in response to the addition or replacement of the dark level signal portion.

The dark peak hold circuit 12 detects and holds the dark peak level of the dark level signal portion of the video signal supplied thereto from the adder 4. The dark peak level held by the dark peak hold circuit 12 is supplied to the level comparator 14, in which it is compared with the reference pedestal level of the reference voltage source 3. A compared output from the level comparator 14 is supplied to the gain controller 8 and the gain of the variable gain amplifier 8 is controlled in response to the compared output level of the level comparator 14 such that the dark peak level becomes coincident with the reference pedestal level.

A blanking signal from an input terminal 10 is supplied to the variable gain amplifier 8 and the dark peak hold circuit 12, whereby the gain of the variable gain amplifier 8 is made zero and the dark peak level detection in the dark peak hold circuit 12 is made inactive. Therefore, a last dark peak level in the video signal portion before the blanking period is maintained. Consequently, the signal below the detected dark level in the video signal portion is lowered to the pedestal level and changed to a dark level signal, thereby emphasizing a contrast. Thus, it becomes possible to improve a picture quality from a visual sense standpoint.

Recent high-definition television receivers use a CRT having a face plate with an aspect ratio of 16:9. When a conventional television signal with an aspect ratio of 4:3 is received and reproduced by the high-definition television receiver, the following problems arise.

These problems will be described below with reference to FIGS. 2A through 2D. As shown in FIG. 2A, when a television signal with an aspect ratio of 4:3 is supplied to and reproduced by a CRT having a face plate with an aspect ratio of 16:9, non-video signal portions (non-picture portions) are produced on both sides of the video signal portion on the picture screen of the CRT. Accordingly, a signal of one horizontal period of that video signal is at the pedestal level in the non-video signal portions as shown in FIG. 2B and becomes lower than the reference dark level (detected dark level).

In this case, as shown in FIG. 2C, when the variable gain amplifier 8 and the dark peak hold circuit 12 are made active within a period T1 including the video signal portion and the non-video signal portions provided at both sides of the video signal portion in which the blanking signal is at low level, the dark peak hold circuit 12 detects and holds the level of the video signal in the non-video signal portions as the dark peak level and the gain of the variable gain amplifier 8 is controlled such that the level of the video signal in the non-video signal portions becomes coincident with the reference pedestal level. As a consequence, the video signal (see FIG. 2D) output from the output terminal 13 is equal to the video signal (see FIG. 2A) from the pedestal clamp circuit 2. Thus, the dark signal portion below the dark detected level of the video signal is not expanded.

SUMMARY OF THE INVENTION

In view of the aforesaid aspect, it is an object of the present invention to provide a dark level restoring circuit for a television receiver in which a dark level signal portion of a video signal can effectively be expanded even when the effective raster size of the video signal becomes smaller than the size of a face plate of a cathode ray tube to produce a non-video signal portion corresponding to a portion outside the effective raster size of the face plate of the cathode ray tube.

According to an aspect of the present invention, there is provided a dark level restoring circuit for a television receiver which is comprised of a video signal source, a pedestal clamp circuit connected to the video signal source and for clamping a pedestal portion of the video signal to a reference pedestal level, a first comparator connected to the pedestal clamp circuit and for comparing the output of the pedestal clamp circuit and a reference dark level, a gain control amplifier connected to the first comparator and for amplifying the output of the first comparator, a synthesizer for synthesizing the outputs of the pedestal clamp circuit and the gain control amplifier, a dark peak hold circuit connected to the synthesizer for holding the dark peak level, a second comparator for comparing the output of the dark peak hold circuit and the reference pedestal level, the output of the second comparator controlling the gain of the gain control amplifier, a blanking signal source, a mute signal circuit for generating a mute signal corresponding to a non-video signal portion when the effective raster size of the video signal is smaller than the size of a face plate of a cathode ray tube to which the video signal is supplied, and a logic circuit for synthesizing the blanking signal and mute signal and for generating a control signal, the control signal controls the gain control amplifier such that the gain of the gain control amplifier is minimum and the dark peak hold circuit such that the holding operation of the dark peak hold circuit is inactive.

BRIEF DESCRIPTION OF THE DRAWINGS

FIGS. 2A through 2D are timing charts used to explain operation of the conventional dark level restoring circuit;

FIGS. 4A through 4F are timing charts used to explain operation of the dark level restoring circuit shown in FIG. 3.

DETAILED DESCRIPTION OF THE PREFERRED EMBODIMENT

Figure 1:
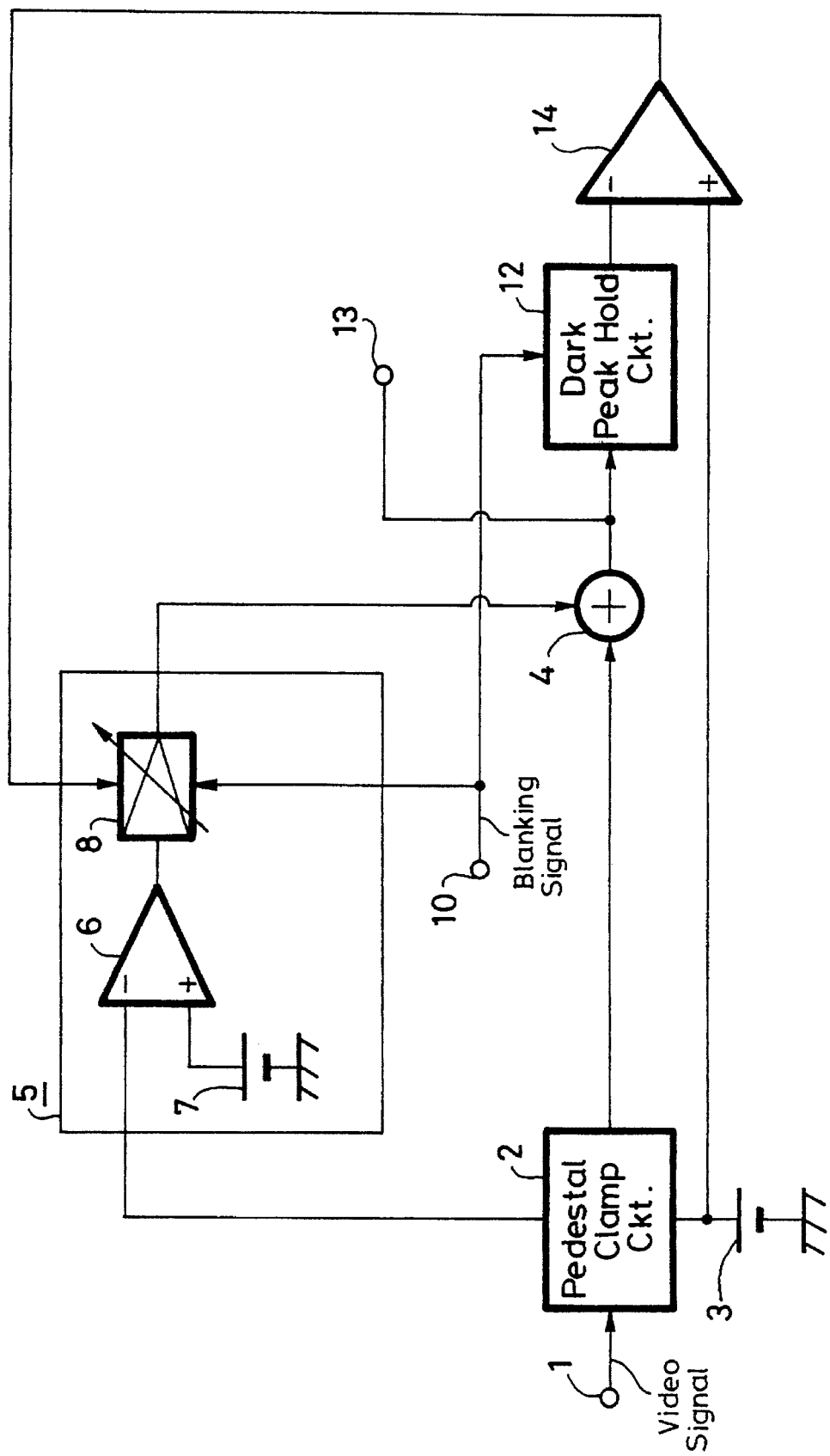
FIG. 1 is a schematic block diagram showing an example of a conventional dark level restoring circuit.
Figure 2A:
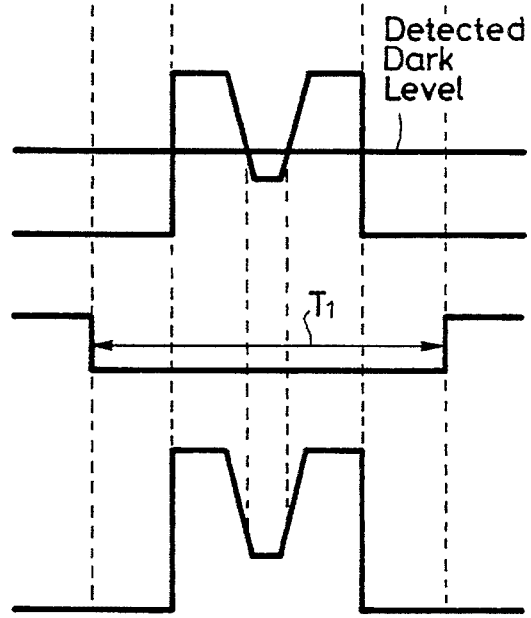
Figure 3:
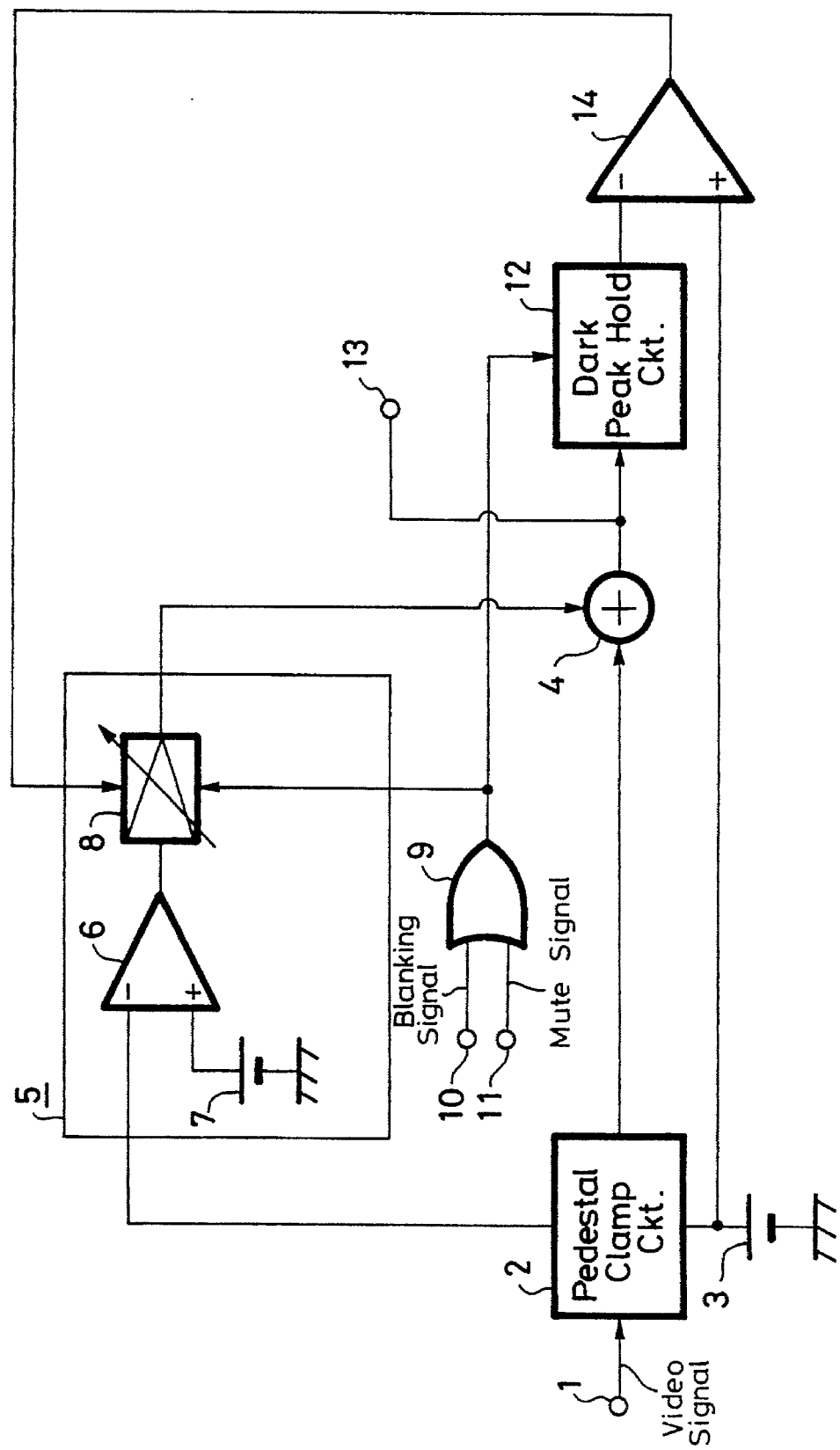
FIG. 3 is a schematic block diagram showing a dark level restoring circuit according to an embodiment of the present invention.

A dark level restoring circuit according to an embodiment of the present invention will hereinafter be described with reference to the drawings. FIG. 3 shows a circuit arrangement of the dark level restoring circuit according to the present invention. In FIG. 3, like parts corresponding to those of FIG. 1 which shows the example of the prior art are marked with the same references and therefore need not be described in detail. As shown in FIG. 3, a blanking signal (see FIG. 4C) applied to the input terminal 10 and a non-video area signal, i.e., mute signal (see FIG. 4D) applied to an input terminal 11 and which indicates the non-video signal portions corresponding to the portions outside the effective raster size of the face plate of the CRT obtained when the video signal from the input terminal 1 is displayed on the effective raster size of the face plate smaller than the face plate of the CRT are supplied to an OR gate 9 and an output signal (see FIG. 4E) of the OR gate 9 is supplied to the variable gain amplifier 8 and the dark peak hold circuit 12, whereby the gain of the variable gain amplifier 8 is made zero in the blanking period and the non-video signal portions and the dark peak detection in the dark peak hold circuit 12 is made inactive.

Therefore, as shown in FIG. 4E, the variable gain amplifier 8 and the dark peak hold circuit 12 are made active only in the video signal portion of the period T2 so that the dark peak hold circuit 12 detects and holds the top of the dark level signal portion below the reference dark level within the video signal portion of the video signal shown in FIG. 4B as the dark peak level. Then, the gain of the variable gain amplifier 8 is controlled such that the dark peak level becomes coincident with the reference pedestal level. Thus, in the output signal (video signal) shown in FIG. 4A obtained from the output terminal 13, the dark level signal portion of the video signal (see FIG. 4A) from the pedestal clamp circuit 2 is expanded.

Figure 5:
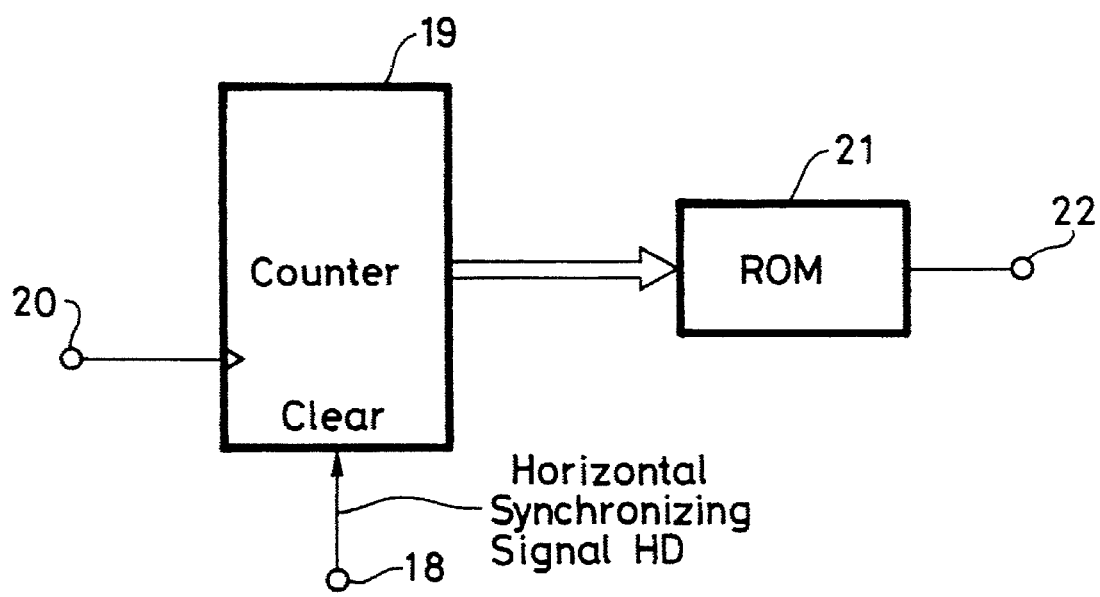
FIG. 5 is a schematic block diagram showing a mute signal generator used in the embodiment of the present inventions.

A circuit for generating a mute signal will be described below with reference to FIG. 5. As shown in FIG. 5, there is provided a counter 19 which clears a count value in response to a horizontal synchronizing signal HD supplied thereto from an input terminal 18. The counter 19 is cleared at the timing of the horizontal synchronizing signal HD supplied thereto and then counts a clock supplied thereto from an input terminal 20. There is provided a ROM (read-only memory) 21 which is operated by the output of the counter 19 supplied thereto as an address signal. The mute signal shown in FIG. 4D is obtained from the ROM 21 at every horizontal period. Specifically, in the ROM 21 are written data which goes to low level when the count value of the counter 19 ranges from 0 to $x_1$ (count value corresponding to a timing t1 in FIG. 4D), data which goes to high level when the count value of the counter 19 ranges from $x_1$ to $x_2$ (count value corresponding to a timing t2 in FIG. 4D), data which goes to low level when the count value of the counter 19 ranges from $x_2$ to $x_3$ (count value corresponding to a timing $t_3$ in FIG. 4D), data which goes to high level when the count value of the counter 19 ranges from $x_3$ to $x_4$ (count value corresponding to a timing point $t_4$ in FIG. 4D) and data which goes to low level when the count value of the counter 19 ranges from $x_4$ to 0 (timing at which the horizontal synchronizing signal HD is supplied one more time and the counter 19 is cleared by the horizontal synchronizing signal HD supplied thereto).

While the arrangement of the mute signal generating circuit has been described so far, the present invention is not limited thereto and various variants thereof may be considered but need not be described herein.

The OR gate 9 is supplied with the blanking signal and the mute signal from the input terminal 10 and 11 and generates the control signal by which the gain of the variable gain amplifier 8 is made zero during the blanking period and the non-video signal portion and the dark peak level detection in the dark peak hold circuit 12 is made inactive. Therefore, it is needless to say that the OR gate or other suitable logic circuits may be used in accordance with polarities of the blanking signal and the mute signal.

According to the present invention, since the gain of the variable gain amplifier is made zero and the dark peak detection in the dark peak hold circuit is made inactive during the non-video signal portions corresponding to the portions outside the effective raster size of the face plate of the cathode ray tube not only during the blanking period but also during the period in which the effective raster size of the face plate becomes smaller than the raster size of the face plate of the cathode ray tube to which the video signal is supplied, it is possible to obtain a dark level restoring circuit for a television receiver in which a dark level signal portion of the video signal can effectively be expanded even if there occur the non-video signal portions which correspond to the portions outside the effective raster size of the face plate of the cathode ray tube.

Having described a preferred embodiment of the invention with reference to the accompanying drawings, it is to be understood that the invention is not limited thereto and that various changes and modifications could be effected therein by one skilled in the art without departing from the spirit or scope of the invention as defined in the appended claims.

What is claimed is:

1. A dark level restoring circuit for a television receiver, comprising:

a video signal input for providing a video signal;

pedestal clamp means connected to said video signal input and for clamping a pedestal portion of said video signal to a reference pedestal level;

first comparator means connected to said pedestal clamp means and for comparing the output of said pedestal clamp means and a reference dark level;

gain control amplifier means connected to said first comparator means and for amplifying the output of said first comparator means;

synthesizing means for synthesizing the outputs of said pedestal clamp means and said gain control amplifier means;

dark peak hold means connected to said synthesizing means for holding the dark peak level;

second comparator means for comparing the output of said dark peak hold means and said reference pedestal level, the output of said second comparator means controlling the gain of said gain control amplifier means;

a blanking signal input for providing a blanking signal;

mute signal means for generating a mute signal corresponding to a non-video signal portion when the effective raster size of said video signal is smaller than the size of a face plate of a cathode ray tube to which said video signal is supplied; and logic means for synthesizing said blanking signal and mute signal and for generating a control signal, said control signal controlling said gain control amplifier means such that the gain of said gain control amplifier means is minimized and said dark peak hold means such that the holding operation of said dark peak hold means is inactive.

2. The circuit as claimed in claim 1, wherein said cathode ray tube has an aspect ratio of 16:9 and said video signal has an aspect ratio of 4:3.

3. The circuit as claimed in claim 1, wherein said mute signal generating means is controlled by a horizontal synchronizing signal of said video signal so as to generate said mute signal corresponding to said non-video signal portion.

* * * * *